(12) United States Patent
Osborn

(10) Patent No.: US 6,557,072 B2
(45) Date of Patent: Apr. 29, 2003

(54) PREDICTIVE TEMPERATURE COMPENSATION FOR MEMORY DEVICES SYSTEMS AND METHOD

(75) Inventor: Neal A. Osborn, Milpitas, CA (US)

(73) Assignee: Palm, Inc., Milpitas, CA (US)

( * ) Notice: Subject to any disclaimer, the term of this patent is extended or adjusted under 35 U.S.C. 154(b) by 64 days.

(21) Appl. No.: 09/853,132

(22) Filed: May 10, 2001

(65) Prior Publication Data

US 2002/0169924 A1 Nov. 14, 2002

(51) Int. Cl.$^7$ ............................................... G06F 12/16
(52) U.S. Cl. ....................... 711/106; 365/212; 365/222; 702/130
(58) Field of Search ................ 702/130–132; 365/222, 212; 711/106

(56) References Cited

U.S. PATENT DOCUMENTS

| | | | | | |
|---|---|---|---|---|---|
| 5,784,328 A | * | 7/1998 | Irrinki et al. | ................ | 365/222 |
| 6,134,167 A | * | 10/2000 | Atkinson | .................... | 365/222 |
| 6,199,139 B1 | * | 3/2001 | Katayama et al. | .......... | 365/222 |
| 6,349,269 B1 | * | 2/2002 | Wallace, Jr. | ................ | 702/130 |
| 6,373,768 B2 | * | 4/2002 | Woo et al. | .................. | 365/211 |
| 6,404,690 B2 | * | 6/2002 | Johnson et al. | ............. | 365/222 |
| 6,438,057 B1 | * | 8/2002 | Ruckerbauer | ............... | 365/222 |

OTHER PUBLICATIONS

Matthews, Jayson, *New Low–Power DRAM for Handheld Market*, InternetNews.com, printed from the website of: http://siliconvalley.internet.com/news/article/0,2198,3531_586351,00.html on May 10, 2001, 3 pps.

Infineon Technologies AG—Products—Mobile–RAM, printed from the website of: http://www.infineon.com/cgi/ecrm.dll/ecrm/scripts/prod_ov.jsp?oid=23931, on May 10, 2001, 2 pps.

Infineon Technologies introduces new Type of Low–Power DRAM for Handheld–Device Market, printed from website of: http://www.infineon.com/cmc_upload/0/000/020/185/Mobile–RAM_128M.pdf on May 10, 2001, 3 pps.

128–MBit Synchronous Low–Power DRAM in Chipsize Packages, Preliminary Datasheet (Rev. 04/01), printed from the website of: http://www.infineon.com/cmc_upload/0/000/017/791/Mobile–RAM_128M.pdf on May 10, 2001, 51 pps.

* cited by examiner

*Primary Examiner*—Reginald G. Bragdon
*Assistant Examiner*—Paul A. Baker
(74) *Attorney, Agent, or Firm*—Foley & Lardner

(57) ABSTRACT

A mobile electronic device is disclosed. The mobile electronic device includes a housing, a processor supported by the housing, and a memory device coupled to the processor, the memory device including an adjustable self-refresh rate setting configured to determine the self-refresh rate of the memory device. The mobile electronic device also includes a temperature sensor supported by the housing, the temperature sensor is coupled to the processor and configured to measure a temperature. The mobile electronic device also includes computer program logic running on the processor, and the computer program logic is configured to predict a future temperature and change the adjustable self-refresh rate setting based on the predicted future temperature.

26 Claims, 3 Drawing Sheets

PREDICTIVE TEMPERATURE COMPENSATION FOR MEMORY DEVICES SYSTEMS AND METHOD

BACKGROUND

Conventionally, handheld computers, laptop computers, personal computers, and other mobile electronic devices may utilize dynamic random access memory (DRAM) devices. A dynamic random access memory is capable of retaining data for only a fraction of a second. Accordingly, data stored in DRAM is typically refreshed, that is read and then rewritten, at a rate somewhat faster than the data would naturally decay, often on the order of 4,000 to 8,000 times per second.

Conventional DRAM chips include special circuitry, known as self-refresh circuitry, that allows the DRAM device to perform the refresh operation automatically and without external circuitry. Such circuitry is used in a special self-refresh mode, when it is not necessary to provide the data to external logic such as a computer processor. It is well understood that a faster refresh rate consumes more power relative to a rate which is slower.

As DRAM devices are used in many handheld computers and other mobile electronic devices, engineers and designers of such mobile electronic devices are consistently concerned with the overall power budget of the device and attempts at lowering power requirements for the devices is of paramount importance. Conventional DRAM chips require that the operating voltage be at approximately 3.3 volts, to both retain data and enable the self-refresh operations. Further, it has been recognized that the rate at which data decays within a DRAM cell is directly related to the operating temperature. The higher the operating temperature, the faster the data decays. Typically, semiconductor devices, including DRAM devices are designed for operation in environments up to approximately 70 degrees C. However, in the case of handheld computers, most are designed for temperatures of up to about 55 degrees C. and typically operate in environments at about 30 degrees C. Accordingly, most conventional DRAM devices are designed to refresh at rates much higher than would be required considering the typical operating temperatures seen by the devices. Thus, extraneous power is being expended in carrying out the higher than necessary refresh rates.

Accordingly, there is a need for a memory device useable in mobile electronic devices in which power requirements are lessened as compared with conventional memory devices. Further, there is a need for a memory device useable in a mobile electronic device in which the refresh rate of the memory device may be adjusted according to operating temperature. Further still, there is a need for a memory device useable in a mobile electronic device in which the refresh rate is adjusted periodically according to a predicted temperature. Yet further still, there is a need for a method of adjusting the refresh rate of a memory device by estimating the future operating temperature.

The teachings herein below extend to those embodiments which fall within the scope of the appended claims, regardless of whether they accomplish one or more of the above mentioned needs.

SUMMARY

An exemplary embodiment relates to a mobile electronic device. The mobile electronic device includes a housing and a processor supported by the housing. The mobile electronic device also includes a memory device coupled to the processor, the memory device including an adjustable self-refresh rate setting configured to determine the self-refresh rate of the memory device. The mobile electronic device further includes a temperature sensor supported by the housing, coupled to the processor and configured to measure a temperature. Further still, the mobile electronic device includes a computer program logic running on the processor, the computer program logic configured to predict a future temperature and change the adjustable self-refresh rate setting based on the predicted future temperature.

Another exemplary embodiment relates to a method of changing the self-refresh rate for a memory circuit having an adjustable refresh rate. The method includes defining a temperature compensated self-refresh rate (TCSR) value. The method also includes measuring a temperature associated with the temperature of the memory circuit. Further, the method includes providing a new TCSR value if the temperature is greater than the current TCSR value. Further still, the method includes storing the current temperature reading with at least one other previous temperature reading. Yet further still, the method includes calculating a predicted temperature reading based on the current temperature and the at least one other previous temperature reading and providing a new TCSR value if the predicted temperature is greater than the current TCSR value.

Yet another exemplary embodiment relates to a handheld computer. The handheld computer includes a housing, a display supported by the housing, a processor supported by the housing and coupled to the display. The handheld computer also includes low power synchronous dynamic random access memory (LPDRAM) coupled to the processor, the LPDRAM including a temperature compensated self-refresh rate (TCSR) setting configured to determine the self-refresh rate of the LPDRAM. The handheld computer also includes a temperature sensor supported by the housing, coupled to the processor and configured to measure a temperature. Further, the handheld computer includes computer program logic running on the processor, and configured to predict a future temperature and change the TCSR based on the predicted future temperature.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Figure 1:
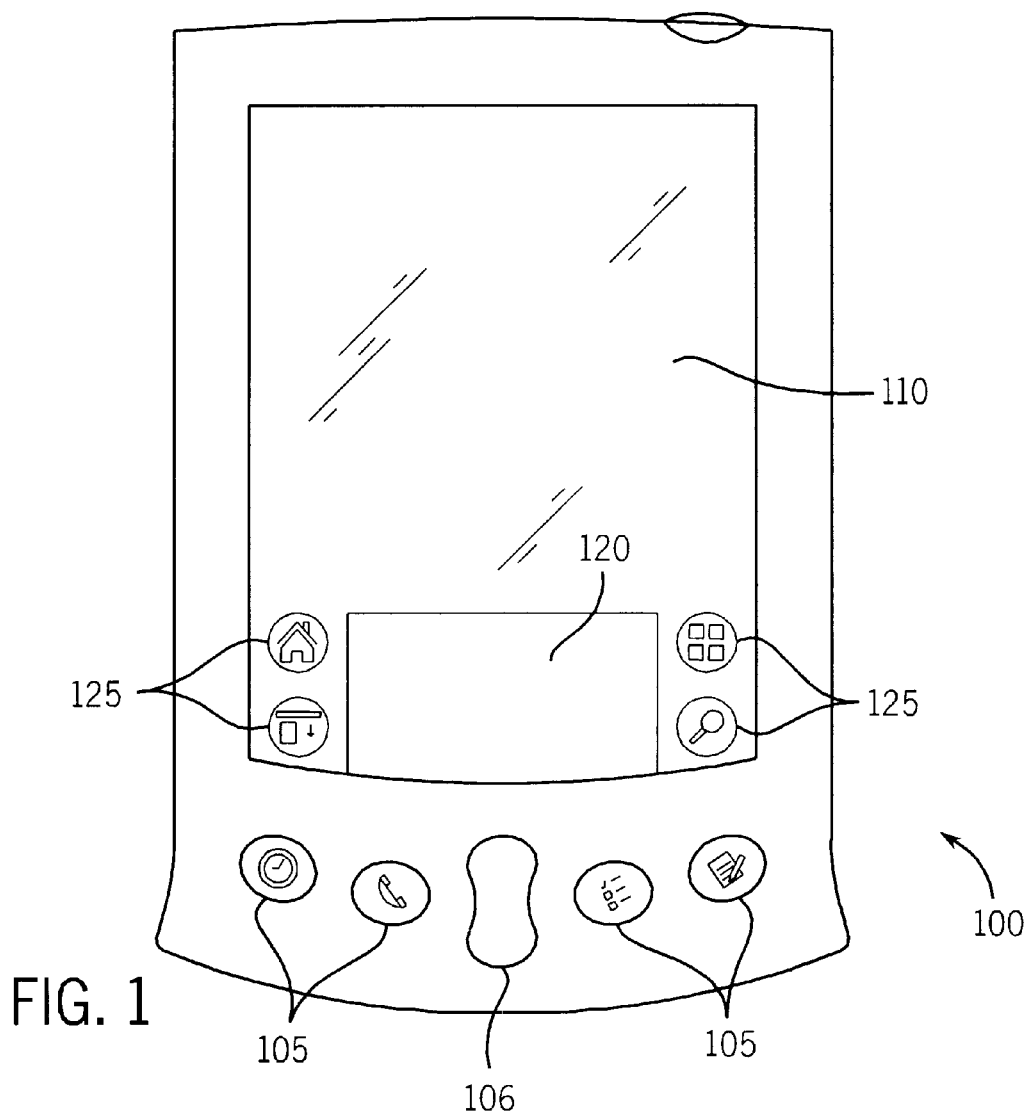
FIG. 1 is an exemplary front elevation view of a handheld computer.

Referring to FIG. 1, a handheld computer 100 is depicted. Handheld computer 100 may include Palm style computers such as those manufactured by Palm, Inc., of Santa Clara, Calif. Other exemplary embodiments of the invention may include Windows CE™ handheld computers, or other handheld computers and personal digital assistants, as well as mobile telephones, and other mobile computing and communications devices. Further, handheld computer 100 may be configured with or without any of a variety of other accessory devices, or in any of a variety of styles and configurations.

Preferably, handheld computer 100 includes interactive hardware and software that performs functions such as maintaining calendars, phone lists, task lists, notepads, calculation applications, spreadsheets, games, and other applications capable of running on a computing device. Handheld computer 100, shown in FIG. 1 includes a plurality of input functions, keys 105, a scrolling key 106, and a display 110 having graphical user interface features. Display 110 may be provided with an interface that allows a user to select and alter displayed content using a pointer, such as, but not limited to, a stylus. In an exemplary embodiment, display 110 also includes a Graffiti™ writing section 120, or other handwriting recognition software, for tracing alphanumeric characters as input. A plurality of input buttons 125 for performing automated or preprogrammed functions may be provided on a portion of display 110. In a particular embodiment, display 110 is a touch screen display that is electronically responsive to movements of a stylus (or other pointing devices, including but not limited to pen tips and fingertips) on the surface of display 110.

Figure 2:
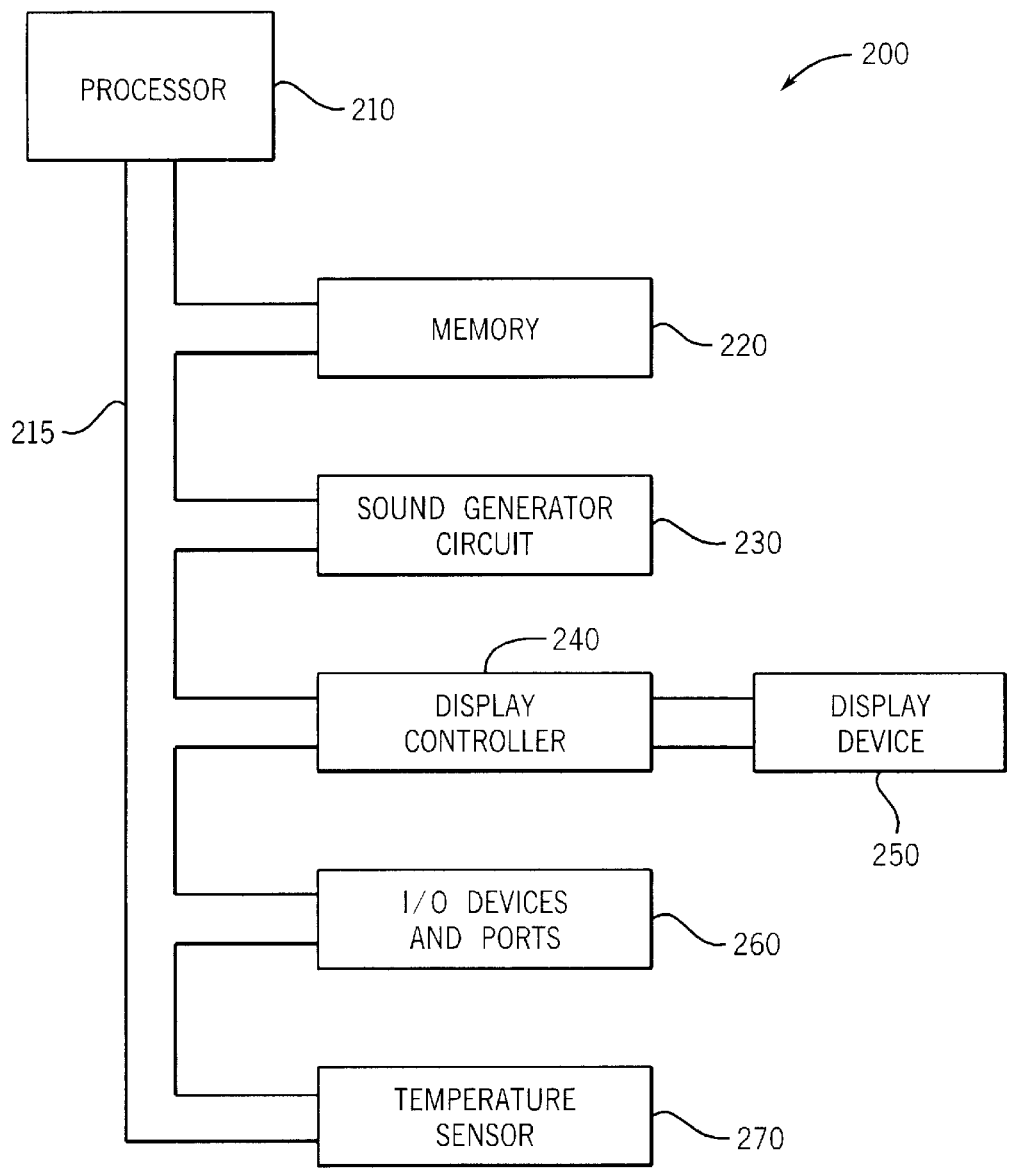
FIG. 2 is an exemplary block diagram of the communications bus for the handheld computer of FIG. 1.

Referring to FIG. 2, an exemplary block diagram of a communications bus architecture 200 for a handheld computer, such as handheld computer 100, is depicted. Communications bus architecture 200 includes a processor 210 coupled to a communications bus 215. A memory 220, a sound generator circuit 230, a display controller 240, various input/output (I/O) devices and ports 260, and a temperature sensor 270 are all coupled to communications bus 215. Further, a display device 250 is coupled to display controller 240 which is coupled to communications bus 215. Processor 210 is configured to run programs stored in memory 220 and to selectively provide sound, as required through a sound generator circuit 230. Further, display device 250 is configured to display information as necessary according to the program running on processor 210 and instructions from display controller 240. Input/output devices and ports 260 are used to provide communication and access to any of a number of and/or a variety of input/output devices, such as, but not limited to, printers, network connections, storage devices, other handheld computers, wireless devices, cellular devices, modems, and the like. Temperature sensor 270 is coupled to communications bus 215 and is configured to provide a signal representative of the operating temperature of handheld computer 200 or of memory 220. Temperature sensor 270 may be any variety of temperature sensing devices including but not limited to thermocouple devices and the like.

In an exemplary embodiment, memory 220 includes a Low Power Synchronous Dynamic Random Access Memory (LPDRAM). LPDRAM generally is similar in operation and structure to conventional DRAM devices, but includes features designed to reduce power consumption in several modes of operation, in particular during self-refresh mode. LPDRAM is representative of a memory type that includes adjustability of the self-refresh rate through any of a variety of mechanisms, including but not limited to a Temperature Compensated Self-Refresh (TCSR). Memory 220 may be any of a variety of memory devices having an adjustable self-refresh rate.

The TCSR value is provided by logic which utilizes data from at least one temperature sensing device, such as temperature sensor 270 external to the LPDRAM device. This use of a TCSR value allows adjustment of the self-refresh rate of the LPDRAM such that the self-refresh rate is slower when the temperature is lower than the maximum specified operating temperature. Providing this temperature compensation functionality has the advantage that it may result in power savings compared to refreshing at a rate consistent with a higher temperature, and compared to DRAM which does not have a temperature compensation feature and therefore is designed to operate at a self-refresh rate corresponding to a substantially elevated temperature. Devices such as DRAM which have a static self-refresh rate are required to operate at a self-refresh rate that corresponds to a temperature much higher than the temperature expected to be seen by the device such that risk of data loss is minimized. Provided with an adaptable (or adjustable) self-refresh rate provides power savings because the self-refresh rate may be lower than a typical self-refresh rate that must include such a margin of safety. The lower the refresh rate that may be achieved the greater magnitude of the power savings.

However, LPDRAM is not guaranteed to retain data in self-refresh mode if the temperature goes above a temperature corresponding to the lower refresh rate. For example, if the LPDRAM has been set to self-refresh at a rate consistent with a temperature of less than 45 degrees C., and the actual temperature while in self-refresh mode goes above 45 degrees C., the LPDRAM device may suffer a loss of data.

A solution is to constantly monitor the temperature, and change the self-refresh rate if the temperature rises above the set point. However, such monitoring and adjustment of the self-refresh rate would have to be done externally to the LPDRAM device. While such external temperature monitoring means are generally straight-forward to implement, the requirement to perform such monitoring on a rapid periodic basis will most likely require more power than is actually saved through the use of the TCSR feature. Accordingly, power savings advantages may be achieved by performing such temperature measurements on a slower periodic basis, and then predicting whether the temperature will be out of range in the future.

Figure 3:
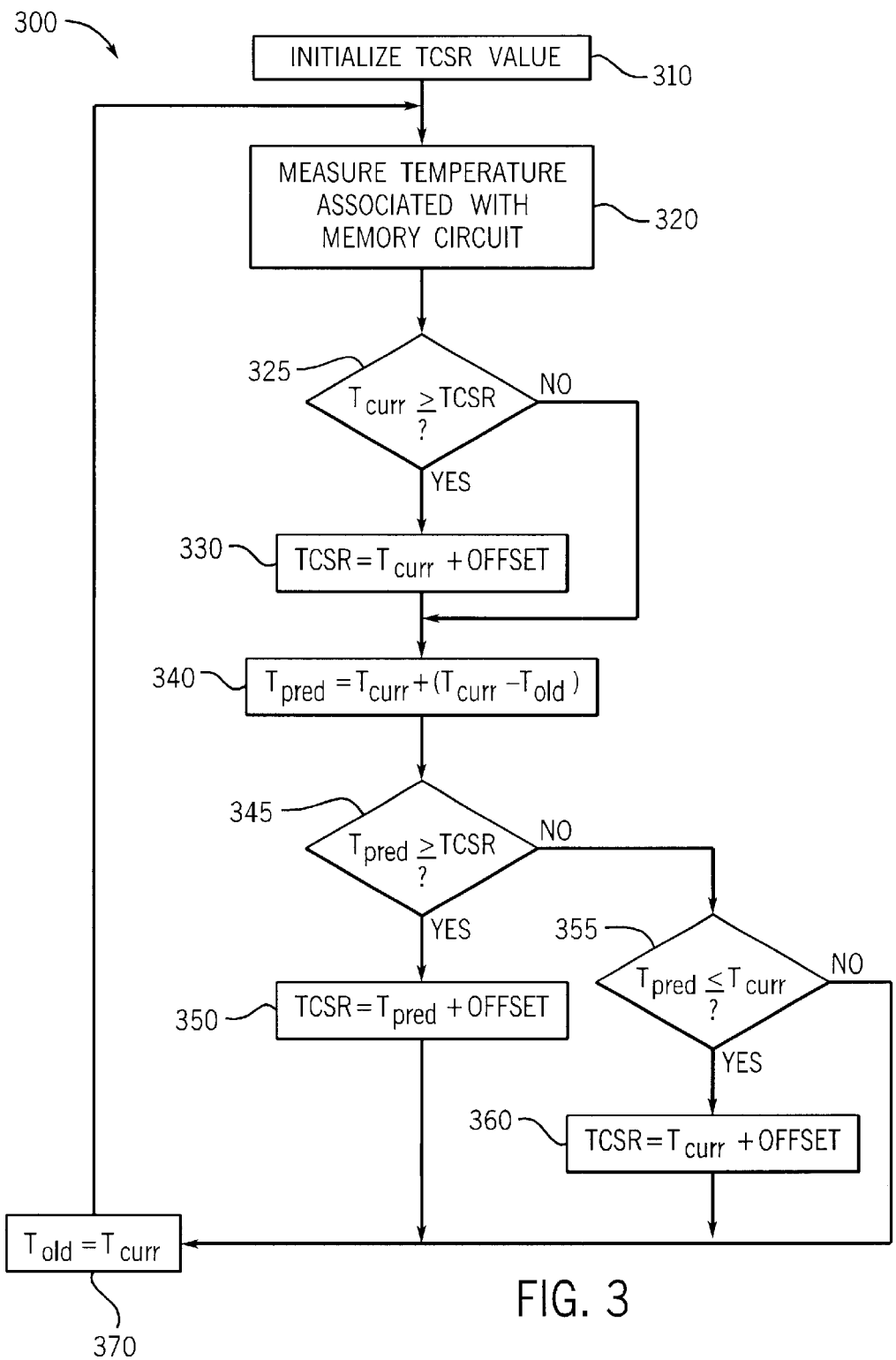
FIG. 3 is an exemplary process diagram of steps relating to the prediction of temperature and adjustment of refresh rate for the memory of the handheld computer of FIG. 1.

Referring now to FIG. 3, a process diagram 300 is provided depicting exemplary steps for estimating future temperature and adjusting the TCSR and hence the self-refresh rate based on the estimated future temperature. A TCSR setting is first initialized (step 310). In an exemplary embodiment the TCSR setting may be in the form of a temperature provided in degrees Celsius (C.), for example. The LPDRAM, or other memory device may be provided with logic that converts the temperature directly to a self-refresh rate that is then applied to the memory device. A measurement of the temperature is then made (step 320) using temperature sensor 270, or the like. The current temperature (Tcurr) is then compared to the TCSR setting (step 325). If Tcurr is greater than or equal to the TCSR setting, the TCSR value is set to Tcurr (step 330). Optionally, an offset may be added to Tcurr providing a temperature tolerance or a margin of error, such that TCSR=Tcurr+offset. If Tcurr is not greater than or equal to the TCSR setting, the TCSR is left unchanged at this step. Next, a predicted temperature is calculated (step 340). The predicted temperature may be a temperature estimating a future temperature. Such temperature predictions may be calculated in numerous ways including complex estimation algorithms and simple curve fitting algorithms, including but not limited to linear regression, quadratic regression, and the like. In an exemplary embodiment, the predicted temperature (Tpred) is calculated simply as Tpred=Tcurr+(Tcurr−Told) where Told is the temperature measurement made previous to Tcurr and stored in memory. Once the Tpred is calculated, Tpred is compared with the TCSR setting (step 345). If the Tpred is greater than or equal to the TCSR setting, TCSR is set to the Tpred value (step 350). In an exemplary embodiment an offset may be optionally added to the Tpred value to provide a margin of tolerance, such that TCSR=Tpred+offset. If Tpred is not greater than or equal to the TCSR setting, Tpred is compared to Tcurr (step 355). If Tpred is less than or equal to Tcurr, the TCSR setting is made equal to Tcurr (step 360). Once again, an offset may be applied to the TCSR setting to provide tolerance. If Tpred is not less than or equal to Tcurr, the TCSR setting is left unchanged. After all of the TCSR setting decisions have been made Told is set to Tcurr and stored for the next period (step 370).

The entire process from step 320 through step 370 is repeated on a periodic basis. The periodic rate used may include but is not limited to any of a variety of rates that would be appropriate for providing a balance of performance and power savings. Such a periodic rate may be, in an exemplary embodiment on the order of 30 seconds, however other rates may be applicable depending on design considerations such as expected temperature environments and desired power savings as well as reliability considerations and data integrity considerations. Further, the self-refresh rate may be determined empirically for a device based on the device's thermal profile and thermal characteristics.

In an exemplary embodiment, the process may be communicated to those of ordinary skill in the art through the following pseudocode (or process steps), which exemplifies the computer program logic that would be implemented in one exemplary manner on a handheld computer or other mobile device platform. The logic is as follows:

Measure temperature at a periodic rate

If most recent temperature is >=TCSR setting, specify new TCSR setting

Store several temperature readings

Add difference between current and previous temperate reading

If predicted temperature is >=TCSR setting, specify new TCSR setting, else

Wait until time for next temperature setting

Only specify lower TCSR setting after that temperature is measured (not predicted), and the next prediction is <=current measurement.

It should be noted that the process is not limited to the precise steps and order of such steps as provided above, but may be embodied in a variety of different ways including a variety of different programmed logic.

While the detailed drawings, specific examples and particular formulations given describe exemplary embodiments, they serve the purpose of illustration only. The hardware and software configurations shown and described may differ depending on the chosen performance characteristics and physical characteristics of the computing devices. For example, the type of computing device, communications bus, or processor used may differ. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A mobile electronic device, comprising:
    a housing;
    a processor supported by the housing;
    a memory device coupled to the processor, the memory device including an adjustable self-refresh rate setting configured to determine the self-refresh rate of the memory device;
    a temperature sensor supported by the housing, coupled to the processor and configured to measure a temperature; and
    computer program logic running on the processor, and configured to predict a future temperature and change the adjustable self-refresh rate based on the predicted future temperature.

2. The mobile electronic device of claim 1, wherein the temperature is measured at a periodic rate.

3. The mobile electronic device of claim 2, wherein the periodic rate is greater than one (1) second.

4. The mobile electronic device of claim 2, wherein the periodic rate is greater than five (5) seconds.

5. The mobile electronic device of claim 2, wherein the periodic rate is greater than ten (10) seconds.

6. The mobile electronic device of claim 2, wherein the periodic rate is greater than thirty (30) seconds.

7. The mobile electronic device of claim 2, wherein the periodic rate is based on the thermal profile of the mobile electronic device.

8. The mobile electronic device of claim 7, wherein the thermal profile is determined empirically.

9. The mobile electronic device of claim 1, wherein the computer program logic uses the difference between a current temperature reading and a previous temperature reading to calculate a predicted temperature reading.

10. The mobile electronic device of claim 1, wherein the memory device is a low power synchronous dynamic random access memory (LPDRAM) device.

11. A method of changing the self-refresh rate for a memory circuit having an adjustable refresh rate, comprising:
    defining a temperature compensated self-refresh rate (TCSR) value;
    measuring a temperature associated with the temperature of the memory circuit;
    providing a new TCSR value if the temperature is greater than the current TCSR value;
    storing the current temperature reading with at least one other previous temperature reading;
    calculating a predicted temperature reading based on the current temperature and the at least one other previous temperature reading; and
    providing a new TCSR value if the predicted temperature is greater than the current TCSR value.

12. The method of claim 11, further comprising:
    lowering the TCSR setting if the current temperature reading is less than the current TCSR and the predicted temperature is less than the current temperature reading.

13. The method of claim 11, wherein the measuring a temperature step is carried out at a periodic rate.

14. The method of claim 13, wherein the periodic rate is based on the thermal properties of a device within which the LPDRAM circuit resides.

15. The method of claim 13, further comprising:
    establishing a desired periodic rate based on empirical results.

16. The method of claim 11, further comprising:
    providing a new TCSR value if the temperature is equal to the current TCSR value.

17. The method of claim 11, further comprising:
providing a new TCSR value if the predicted temperature is equal to the current TCSR value.

18. The method of claim 11, wherein the memory circuit is a low power synchronous dynamic random access memory (LPDRAM) circuit.

19. A handheld computer, comprising:
a housing;
a display supported by the housing;
a processor supported by the housing and coupled to the display;
low power synchronous dynamic random access memory (LPDRAM) coupled to the processor, the LPDRAM including a temperature compensated self-refresh rate (TCSR) setting configured to determine the self-refresh rate of the LPDRAM;
a temperature sensor supported by the housing, coupled to the processor and configured to measure a temperature; and
computer program logic running on the processor, and configured to predict a future temperature and change the TCSR based on the predicted future temperature.

20. The handheld computer of claim 19, wherein the temperature is measured at a periodic rate.

21. The handheld computer of claim 20, wherein the periodic rate is greater than one (1) second.

22. The handheld computer of claim 20, wherein the periodic rate is based on the thermal profile of the handheld computer.

23. The handheld computer of claim 22, wherein the thermal profile is determined empirically.

24. The handheld computer of claim 19, wherein the computer program logic uses the difference between a current temperature reading and a previous temperature reading to calculate the predicted temperature.

25. The handheld computer of claim 19, wherein the computer program logic uses linear interpolation of the current temperature and a previous temperature to calculate the predicted future temperature.

26. The handheld computer of claim 19, wherein the computer program logic uses quadratic fitting of the current temperature and at least two other temperatures to calculate the predicted future temperature.

* * * * *